Patented Sept. 9, 1952

2,610,163

UNITED STATES PATENT OFFICE 2,610,163

EASILY PROCESSED POLYMERIC COMPOUNDS AND METHOD OF MAKING SAME

Theodore A. Te Grotenhuis, Olmsted Falls, Ohio

No Drawing. Application December 17, 1948, Serial No. 65,968

8 Claims. (Cl. 260—29.7)

This application is a continuation-in-part of my prior application, Serial No. 559,848, filed October 21, 1944, now Patent No. 2,457,097, and the invention relates to a synthetic rubberlike compound and to a method of making same. It particularly relates to vulcanizable synthetic rubberlike compounds that are easily processible and extrudable, and retain their extruded shape, and to a method of preparing such compounds.

The synthetic rubbers, particularly those of the Buna-type, which are polymers or copolymers of a conjugated diolefinic compound, such as butadiene or copolymers of such diolefinic compounds with one or more mono-olefines copolymerizable therewith, are generally characterized by having relatively low tensile strength and very poor properties unless they are compounded with a reinforcing filler, such as carbon black and the like. These Buna-type synthetics thus differ greatly from natural rubber, which has a very high gum strength and does not require any reinforcing filler.

A filling material, when sufficiently fine, greatly increases the strength of most of the synthetic rubbery polymers; but such filling material also has the effect of greatly increasing the stiffness and hardness of the compound, rendering it less rubberlike. Frequently it is desired to prepare relatively soft flexible articles similar to gum rubbers from synthetic rubbers, and the incorporation of pigments, such as carbon black and the like, is impossible because of the resultant hardness they contribute to the rubber compound.

It is one object of the present invention to prepare a compound suitable for producing synthetic rubber articles of low pigment loading and having properties in a gum rubberlike state superior to those generally prepared from homogeneous rubber compounds.

One of the most economical methods of forming rubbery materials is by extrusion processes wherein the material is extruded under high pressure through an orifice of the desired shape. In the extrusion of rubbery materials one of the great difficulties is due to the fact that rubbery materials have a very substantial tendency to change in shape after they are emitted from the extrusion die. This is either due to the elastic memory in the plastic material and a tendency to retain the shape it held before it was extruded, or due to the extreme softness of the material and a tendency to flow during the curing operation. To prevent the elastic memory from effecting change of shape after extrusion, it has been the general practice in the industry to plasticize the rubbery materials prior to extrusion to such an extent that little, if any, elastic memory is retained. This, however, increases their tendency for plastic flow after extrusion. To reduce this latter, a substantial amount of fillers, such as pigments, carbon black and the like, has been considered necessary.

The plasticization of the rubber so that it can be extruded is recognized as being greatly detrimental to the strength of the extruded article, probably because the molecular structure of the polymer is radically changed by the plasticization or mastication process used. Thus gum rubber articles vulcanized from such plastic materials have much lower strength than have similar articles made from polymers which have not been so radically plasticized and masticated.

An object of the present invention is to provide rubber-like compounds and a method of making the same, which compounds are capable of being compounded with curing agents and cured to a state resembling vulcanized rubber, can be masticated and extruded through a die to retain its shape, and may be cured in open air or steam without requiring large amounts of inorganic filling materials, so that a resultant article may be produced which is analogous to those composed of soft vulcanized natural gum rubber and which is less deteriorated by masticating processes than are rubbers generally.

Other objects will be apparent from the following description of the invention.

This invention is largely possible because of the small particle size of synthetic rubber particles in synthetic rubber latices, which synthetic particles in contradistinction to the particles in natural rubber latex approach in fineness, if they are not finer, than many reinforcing pigments. In accordance with the present invention, a vulcanized synthetic latex is admixed with a latex of an unvulcanized and plastic rubbery polymer, which may be natural rubber or a synthetic polymer. This mixture is coagulated, preferably dried, and then masticated to produce a compound that, when it is suitably combined with vulcanizing agents and the like, may be readily extruded and cured to produce objects of various shapes.

The coagulum obtained above therefore comprises particles of one or more vulcanized synthetic rubbery polymers of small diameter, admixed with particles of one or more unvulcanized plastic synthetic rubbers or natural rubber. Since the vulcanized particles are cross-linked by sulfur or vulcanizing agent and are therefore extremely resistant to forces tending to cause their deformation, the plastic (unvulcanized) particles tend to take up all of the deformation during any masticating process and are formed into a matrix or continuous phase containing the vulcanized synthetic or sulfur-cross-linked rubber distributed therethrough. The product is similar to the heterogeneous compound described and claimed in my aforementioned application, where the disperse phase is cross-linked by polymerization to the relatively tough state instead of being cross-linked by a rubber-vulcanizing agent, such as sulfur, selenium, tellurium or any other rubber-vulcanizing agent. A vulcanized synthetic latex or synthetic latex cross-linked by a polymer-vulcanizing agent is essential for forming the disperse phase of compounds of the present invention. The plastic particles that are formed into the matrix may be derived from a natural or synthetic latex, however.

Suitable latices for forming the vulcanized disperse phase of my compounds are the synthetic emulsion polymers of a liquid comprising a conjugated diolefinic compound such as butadiene, isoprene, chloroprene, 2,2-dimethylbutadiene and the like, preferably of six carbon atoms and less, and copolymers of one or more of these conjugated dienes with a copolymerizable mono-olefinic compound, such as aryl-olefinic compounds having the olefinic group in conjugated relation with an unsaturated linkage of the aromatic ring and including styrene, alpha-methylstyrene, 3,4-dichloro-alpha-methylstyrene and the like, the esters and nitriles of acrylic and methacrylic acids, vinyl pyridine, dimethylvinylethinyl, carbinol, methylisopropenyl ketone, etc. The plastic latices to be mixed with the vulcanized latex include any one or more of those prepared from the above combination of monomers suitable for forming the disperse phase when vulcanized, and natural rubber as well. In fact, natural latex is especially desirable for the plastic matrix or continuous phase of my compounds, although the fine particle size of the vulcanized synthetic latex is required for the disperse phase.

The particle size of synthetic latices as used for the disperse phase is extremely small, being but a fraction of that of natural latex and being generally less than 200 angstroms (Å.) in diameter. Some synthetic latices, however, have particle sizes as low as 400 or 500 Å. units, and they may run as high as 3000 or 4000, or even 5000 Å. units when prepared by special procedures. Particles of the large particle size synthetic latices are but a fraction of the size of particles in natural rubber latex.

The polymerization of the monomeric materials in forming the synthetic latices may be accomplished by any method and forms no part of the present invention. Generally, the monomeric materials are agitated in an aqueous solution of an emulsifying agent, such as a fatty acid or rosin soap or other cationic or emulsifying agent, in the presence of a suitable free radical forming catalyst, such for example as a water-soluble or monomer-soluble per salt, such as benzoyl peroxide, hydrogen peroxide, potassium persulfate, etc.

The curing of the synthetic latex for the disperse phase may be accomplished by any suitable means that does not cause coagulation thereof, and processes used for making natural cured rubber latex are suitable. Generally, the preferred procedure is to incorporate into the synthetic latex to be cured so that it forms the disperse phase of the compounds of the present invention an aqueous dispersion of a suitable curing agent, such as sulfur, and an aqueous dispersion or solution of an organic accelerator, together with a suitable stabilizing agent, such for example as the "Daxad," a condensation product of naphthalene sulfonic acid with formaldehyde, and/or other suitable protective colloid, if required, to prevent coagulation during the curing step. If an ultra accelerator is used the curing may be accomplished by allowing the latex mixture to stand at room temperature. Generally it is incorporated into a closed container, preferably under gas pressure, and heated and stirred for sufficient time to cause the particles of the dispersed polymer to change from the plastic to the substantially elastic state. These particles, which are cross-linked by curing agents such as sulfur, are extremely resistant to deformation; because of their extremely small particle size, corresponding to or approaching reinforcing pigments, they apparently are able to act as stiffeners or reinforcing agents for the plastic component of the compositions of the present invention. They still retain their soft, resilient rubberlike character, however, and thus permit the retainment of a soft rubber compound as distinguished from inorganic fillers and pigments heretofore used. Because they are elastic and therefore more rigid than the plastic particles, these vulcanized particles move bodily without appreciable injury in the plastic matrix upon milling and mastication of the wet or dried coagulum. The dispersed particles are therefore unmasticated and have their original unmasticated structure even after mastication of the coagulum or dry compound. The higher gum strength of the unmasticated particles forming the disperse is thus preserved and deterioration of mastication is substantially entirely in the plastic matrix. The higher gum strength of the fine unmasticated particles is thus able to act as a pigment to improve gum strength of the final article cured from the masticated and compounded coagulum.

The two latices generally have compatible emulsifying agents in order to facilitate intimate mixing prior to coagulation, i. e., both the plastic and the vulcanized latex are generally positive or negative, although a coagulated mixture may also be easily formed by combining one or more positive latices with one or more negative latices. This is especially true when the vulcanized and unvulcanized latices are in substantially equal proportions.

The proportions of the two latices may be varied quite widely. As little of the vulcanized rubbery solids (solids from the vulcanized rubber latex) as 10% by weight of the total polymer or rubbery solids in the compound gives noticeable improvement in the resultant coagulum. But it is generally preferable that the solids of the vulcanized rubbery latex be present in amounts of 30% to 60% by weight of the coagulum, and as high as 85% to 90% by weight of the solids from the vulcanized latex may be present. The plastic phase latex, however, should always be present in sufficient amount to maintain a continuous phase in the masticated coagulum, and about 10% to 15% of the coagulum is usually required for this purpose. The stiffness of the unvulcanized compounds or resistance to plastic flow is substantially increased by increase in the proportion of the vulcanized phase when present in high proportions, although extrudability is increased.

Around equal parts of disperse phase and matrix composition are desirable for most applications in that the compound, when sufficiently masticated, is readily extrudable and has sufficient rigidity to permit curing of the extruded article in open steam without appreciable plastic flow.

The following examples, in which parts are by weight, illustrate the present invention:

*Example 1*

100 parts of a mixture of monomers containing 75 parts of butadiene, 10 parts of dichlorostyrene and 15 parts of styrene, having dissolved therein about .05 part of dodecyl mercaptan, are emulsified by agitation with 250 parts of water and about 5 parts of an emulsifying agent, such as soap, sodium oleate or polymethyl acrylamide, .25 part of sodium silicate and about .3 part of potassium cobaltinitrite. The emulsion thus obtained is incorporated into a vessel of such volume that it is completely filled with liquid. It is thereby polymerized by maintaining it with constant agitation at slightly elevated temperatures of above 50° C. until there is obtained a latex having a total solid content of at least 65% or 70% of the theoretical possibility. Hydroquinone or other material capable of preventing further polymerization may if desired be added as is customary practice.

Into 100 parts of the latex thus obtained (based on the rubbery content thereof) is incorporated about 1 part of sulfur, 1 part of accelerator (piperidine pentamethylene dithiocarbamate) and a very small amount of zinc oxide, all in the form of an aqueous dispersion which contains a suitable amount of a wetting agent, such as sodium lauryl sulfonate, and about 3 parts of Daxad (a condensation product of naphthalene sulfonic acid and formaldehyde) or other suitable dispersing or stabilizing agent.

The compounded latex thus produced is, without coagulation, partially vulcanized in suitable manner, as by heating at about 160° F. in a closed vessel for about one and one-half hours.

*Example 2*

|  | Parts solids |
|---|---|
| Vulcanized standard GR–S latex (GR–S is a butadiene-styrene copolymer "E" of Reconstruction Finance Corporation) | 100 |
| Natural rubber latex | 100 |

The above latices are mixed together, and the mixture coagulated by addition of salt and sulfuric acid. The coagulum is washed and dried and is compounded on a rubber mill in conventional manner with the usual curing agents, accelerator, zinc oxide and antioxidant.

The mastication on a rubber mill is continued until the mixture has a plasticity of about 40 units or less on a Mooney shearing disc plastometer. It is then extruded through a die to form a gasket and cured in open steam. The resultant product retains the general shape of the die, much better than does a homogeneous product of the same extrudability. The product also has the appearance of a soft gum rubber and has high tensile strength.

*Example 3*

|  | Parts solids |
|---|---|
| Vulcanized latex of Example 1 | 60 |
| Standard GR–S latex | 40 |

The above latices are blended, compounded in latex form with an aqueous dispersion of 1 part sulfur, 1 part accelerator and 1 part zinc oxide, and the mixture coagulated as in Example 2 with salt and sulfuric acid. The coagulum is washed, dried, masticated, and optionally mixed with 10 parts of P–33 (a thermatonic carbon black) and 25 parts of crude rubber. The mixture thus obtained is extruded through a die and cured in open steam to form a rubber article. The resultant article is soft rubber-like and flexible and retains, after extrusion and curing, substantially the cross sectional shape of the extrusion die.

In place of the GR–S latex in Example 1, one may use other cured synthetic latices such as an aqueous dispersion of the copolymer of butadiene and acrylonitrile, or an aqueous dispersion of polymer formed from monomers containing other conjugated dienes as before mentioned in place of butadiene 1,3. The latex of Example 1 may also be substituted in Examples 2 and 3 by a plurality of vulcanized or sulfur-cross-linked synthetic latices prepared from different comonomers, and/or the same comonomers in different proportions. The natural latex of Example 2 may be substituted in whole or in part by one or more unvulcanized, relatively plastic synthetic latices or aqueous dispersions of plastic synthetic rubbery polymers to give similar results. It is generally preferred for most purposes that the mixed latices be compatible with each other. Thus, vulcanized latices of polymers soluble in aliphatic solvents, as in Buna-S rubber and the like are generally preferred with plastic natural rubber or plastic Buna-S latices. For some purposes, e. g., where oil resistance is desired, however, products may also be made by combining an aqueous dispersion of an oil-resistant polymer such as vulcanized acrylonitrile-butadiene copolymer latex with an unvulcanized latex of a polymer such as Buna-S or natural rubber that is soluble in aliphatic solvents. Similarly, considerably improved articles that are desirable for many purposes may be made by combining a vulcanized latex of a polymer soluble in aliphatic hydrocarbons with a latex of a plastic oil-resistant polymer, such as butadiene-acrylonitrile copolymer obtainable under such trade names as "Hycar OR–25" latex or "Perbunan" latex.

A vulcanized synthetic latex is one having particles of polymer cross-linked with a suitable vulcanizing agent, such as sulfur, so that the particles are in a more elastic state. It is thus distinguished from a latex having particles cross-linked by polymerization as described in my aforementioned application.

While sulfur has been used as the vulcanizing agent in the above examples, any of the various vulcanizing agents suitable for vulcanizing the respective polymer and forming a bridge between molecules of the polymer after polymerization may be used in place of all or part of the sulfur.

Although the invention may be employed in various ways, only preferred embodiments have been illustrated and described. Other embodiments may be made within the invention as provided by the patent statutes.

What I claim is:

1. A curable, dried mass of masticated coagulum from a latex comprising an aqueous dispersion of an unmasticated vulcanized copolymer of butadiene and styrene and an aqueous dispersion of a plastic polymer of a conjugated diolefinic compound of less than six aliphatic carbon atoms, said coagulum having a curing agent dispersed therein and having a plasticity of no more than 40 when measured under standard conditions on a Mooney plastometer, whereby it may be shaped and cured in shaped form.

2. The product of claim 1 wherein the polymer of the plastic diolefinic compound is natural rubber.

3. In a method of making a heterogeneous compound which may be readily extruded to a shape through an extrusion die, the steps which comprise forming a mixture of a vulcanized synthetic latex having as a disperse phase thereof a synthetic polymer of a diolefinic compound having not in excess of six aliphatic carbon atoms, and of a latex having as a disperse phase thereof an unmasticated unvulcanized plastic rubbery polymer of a diolefinic compound having not in excess of six aliphatic carbon atoms, coagulating the mixture thus formed, drying and masticating compounding agents into the dried coagulum.

4. The method of claim 3 wherein the vulcanized synthetic latex is an aqueous dispersion of a copolymer of butadiene and an arylvinyl compound.

5. The method of claim 3 wherein the vulcanized synthetic latex is an aqueous dispersion of a copolymer of butadiene and an arylvinyl compound, and is characterized by having a particle size less than 3000 angstrom units, and wherein the plastic latex is an aqueous dispersion of natural rubber.

6. The method of claim 3 wherein said masticated coagulum is extruded to a desired shape and cured.

7. An extruded and vulcanized article comprising a masticated, compounded, extruded, dried mass of a coagulum of a mixture of a vulcanized synthetic latex having as a dispersed phase thereof a synthetic polymer of a diolefinic compound having not in excess of six aliphatic carbon atoms and of a latex having as a dispersed phase thereof a masticated unvulcanized plastic rubbery polymer of a diolefinic compound having not in excess of six aliphatic carbon atoms, said coagulum having a continuous phase of particles of said unvulcanized plastic polymer smeared together.

8. A molded article comprising a vulcanized shaped mass of a masticated and compounded dried coagulum of a mixture of a vulcanized synthetic latex having as a dispersed phase thereof a synthetic polymer of a diolefinic compound having not in excess of six aliphatic carbon atoms and of a latex having as a dispersed phase thereof a masticated unvulcanized plastic rubbery polymer of a diolefinic compound having not in excess of six aliphatic carbon atoms.

THEODORE A. TE GROTENHUIS.

REFERENCES CITED

The following references are of record in the file of this patent:

UNITED STATES PATENTS

| Number | Name | Date |
|---|---|---|
| 1,831,895 | Van Arsdel et al. | Nov. 17, 1935 |
| 2,088,407 | Dales et al. | July 27, 1937 |
| 2,335,104 | Britt et al. | Nov. 23, 1943 |